US012651448B2

(12) United States Patent
Lopez

(10) Patent No.: US 12,651,448 B2
(45) Date of Patent: Jun. 9, 2026

(54) METHOD AND SYSTEM FOR AUTOMATED TARGET RECOGNITION

(71) Applicant: DRS Network & Imaging Systems, LLC, Melbourne, FL (US)

(72) Inventor: Marco Lopez, Villa Park, CA (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 629 days.

(21) Appl. No.: 17/687,251

(22) Filed: Mar. 4, 2022

(65) Prior Publication Data

US 2022/0284703 A1    Sep. 8, 2022

Related U.S. Application Data

(60) Provisional application No. 63/157,183, filed on Mar. 5, 2021.

(51) Int. Cl.
*G06V 10/82*      (2022.01)
*G06V 10/22*      (2022.01)
(Continued)

(52) U.S. Cl.
CPC .............. *G06V 10/82* (2022.01); *G06V 10/22* (2022.01); *G06V 10/764* (2022.01); *G06V 10/774* (2022.01)

(58) Field of Classification Search
CPC ...... G06V 10/82; G06V 10/22; G06V 10/764; G06V 10/774; G06V 10/75; G06V 10/85
(Continued)

(56) References Cited

U.S. PATENT DOCUMENTS

| | | | |
|---|---|---|---|
| 10,540,572 B1 * | 1/2020 | Kim ...................... | G06F 18/214 |
| 2019/0073520 A1 * | 3/2019 | Ayyar .................. | G06V 40/172 |

(Continued)

FOREIGN PATENT DOCUMENTS

| | | | | |
|---|---|---|---|---|
| CN | 111931764 A | * | 11/2020 | ........... G06F 18/241 |

OTHER PUBLICATIONS

Label-PEnet: Sequential Label Propagation and Enhancement Networks for Weakly Supervised Instance Segmentation, by Weifeng Ge, Weilin Huang, Sheng Guo, Matthew Scott, 2019 IEEE/CVF International Conference on Computer Vision (ICCV) (2019, pp. 3344-3353), Mar. 27, 2020 (Year: 2020).*

(Continued)

*Primary Examiner* — Jennifer Mehmood
*Assistant Examiner* — Heath E. Wells
(74) *Attorney, Agent, or Firm* — Kilpatrick Townsend & Stockton LLP

(57)        ABSTRACT

A method includes receiving, from an image sensor, an image, identifying, by a first neural network, a plurality of locations-of-interest within the image, and generating, by the first neural network, a first classification label for each location-of-interest of the plurality of locations-of-interest. The method also includes extracting, from the image, a plurality of image chips derived from the plurality of locations-of-interest and generating, by a second neural network, a second classification label for each image chip of the plurality of image chips. The method further includes determining an identification of a set of targets within the image using the plurality of locations-of-interest, the first classification label for each location-of-interest of the plurality of locations-of-interest, the plurality of image chips, and the second classification label for each image chip of the plurality of image chips, and transmitting the identification of the set of targets within the image.

17 Claims, 8 Drawing Sheets

(51) Int. Cl.
_G06V 10/764_ (2022.01)
_G06V 10/774_ (2022.01)

(58) Field of Classification Search
USPC .......................................................... 382/156
See application file for complete search history.

(56) References Cited

U.S. PATENT DOCUMENTS

| | | | |
|---|---|---|---|
| 2019/0102646 A1* | 4/2019 | Redmon ................ | G06V 20/20 |
| 2020/0293828 A1 | 9/2020 | Wang et al. | |
| 2021/0004589 A1 | 1/2021 | Turkelson et al. | |
| 2021/0034865 A1* | 2/2021 | Nord ..................... | G06F 18/254 |
| 2021/0097344 A1* | 4/2021 | Goldstein .......... | G06V 30/2504 |
| 2021/0227126 A1* | 7/2021 | Se ........................ | G06V 10/764 |
| 2022/0027672 A1* | 1/2022 | Xu ........................ | G06N 3/084 |
| 2024/0144566 A1* | 5/2024 | Bagherinezhad ...... | G06N 3/045 |

OTHER PUBLICATIONS

A New Self-Organizing Neural Gas Model based on Bregman Divergences, by Esteban J. Palomo, Miguel A. Molina-Cabello, Ezequiel Lopez-Rubio, Rafael Marcos Luque-Baena, Pub: 2018 International Joint Conference on Neural Networks (IJCNN) (2018, pp. 1-8), Jul. 1, 2018 (Year: 2018).*

Modified Semi-Supervised Adversarial Deep Network and Classifier Combination for Segmentation of Satellite Images, by Manami Barthakur, Kandarpa Kumar Sarma, Nikos Mastorakis, IEEE Access (vol. 8, 2020, pp. 117972-117985) Jun. 24, 2020 (Year: 2020).*

Girshick et al., "Region-based Convolutional Networks for Accurate Object Detection and Segmentation", IEEE transactions on pattern analysis and machine intelligence, vol. 38, No. 1, May 25, 2015, pp. 1-16.

PCT/US2022/018990 , "International search report and written opinion", Jul. 14, 2022, 13 pages.

* cited by examiner

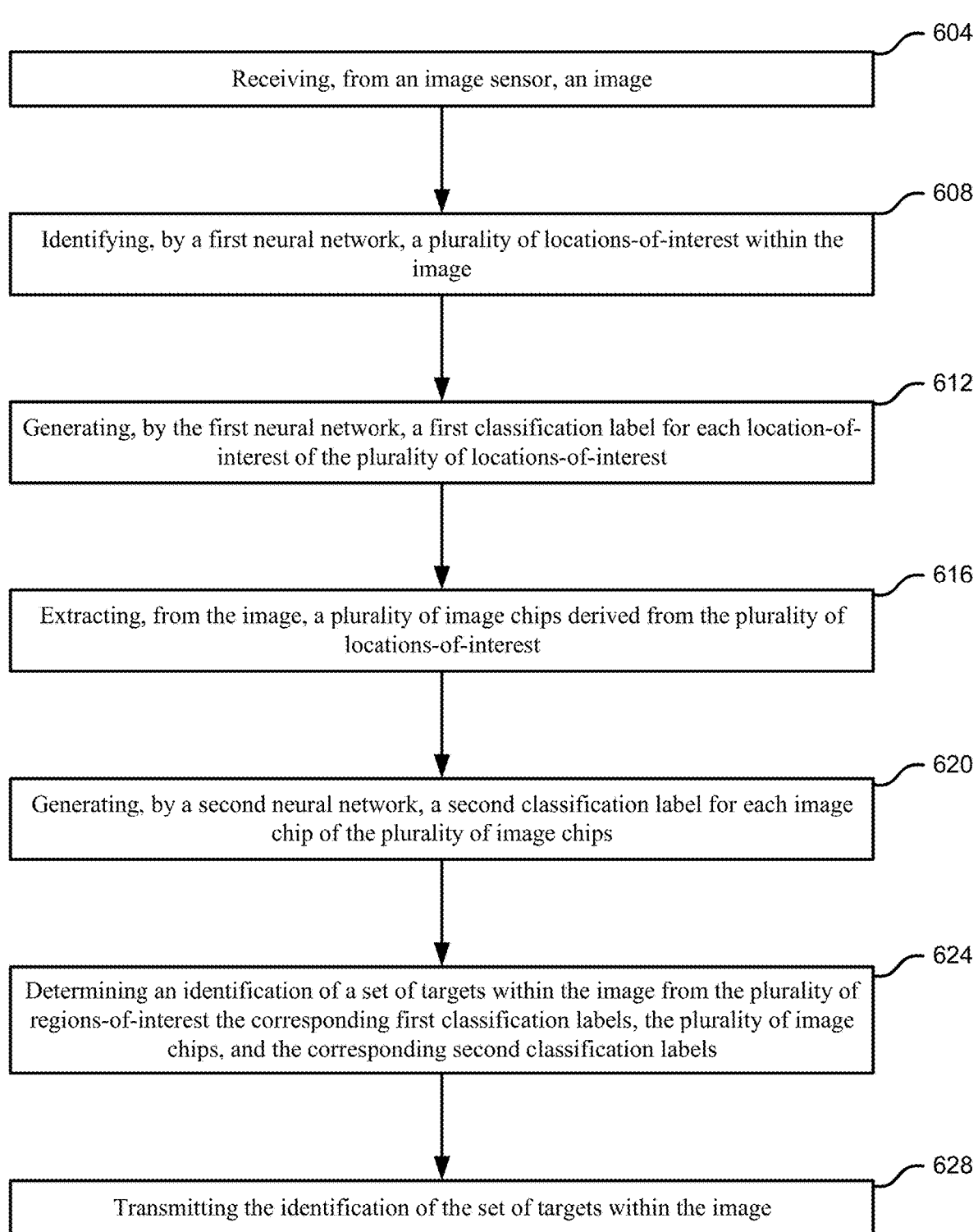

604

Receiving, from an image sensor, an image

608

Identifying, by a first neural network, a plurality of locations-of-interest within the image

612

Generating, by the first neural network, a first classification label for each location-of-interest of the plurality of locations-of-interest

616

Extracting, from the image, a plurality of image chips derived from the plurality of locations-of-interest

620

Generating, by a second neural network, a second classification label for each image chip of the plurality of image chips

624

Determining an identification of a set of targets within the image from the plurality of regions-of-interest the corresponding first classification labels, the plurality of image chips, and the corresponding second classification labels

628

Transmitting the identification of the set of targets within the image

*FIG. 6*

METHOD AND SYSTEM FOR AUTOMATED TARGET RECOGNITION

CROSS-REFERENCE TO RELATED APPLICATIONS

This application claims the benefit of U.S. Provisional Application No. 63/157,183, filed Mar. 5, 2021, the contents of which are hereby incorporated by reference in their entirety for all purposes.

BACKGROUND OF THE INVENTION

Neural networks can be used to automatically detect, recognize, classify, and identify objects within images with reasonable accuracy. The accuracy of a neural network may be dependent on how the neural network is trained. For example, neural networks configured for object identification may be trained using supervised learning in which a set of training images and corresponding labels may be used to teach the neural network how to detect, recognize, classify, and identify a particular object. While some images may be obtained with a pre-generated label (e.g., from a database or the like), for most images, a user would have to review each image and manually generate a label. This may introduce errors into the training process, resulting in inaccurately labeled images (e.g., human error) potentially degrading the accuracy of the neural network.

The quantity of training images used to train the neural network may further affect the accuracy of the neural network once trained. It may not be possible to obtain the requisite quantity of training images, especially if the object to be classified and identified is rare. In addition, the quantity of training images needed to teach the neural network to detect, recognize, classify, or identify an object scales proportionally with the number of different object types the neural network is configured to identify. For instance, a neural network configured to identify two object types may require twice as many labeled images as a neural network configured to identify one object type. For many applications, this may require a very large quantity of images to train the neural network. Moreover, since most, if not all, of the images must be manually labeled, it may be difficult and time consuming to obtain a set of images and corresponding labels to train the neural network.

Therefore, there is a need in the art for improved methods and systems related to training of neural networks.

SUMMARY OF THE INVENTION

Embodiments of the present invention generally relate to automatic object detection, classification, recognition, and identification; and more particularly to a neural network augmented with a self-organizing map classifier that automatically classifies and identifies objects within images.

According to an embodiment of the present invention, a method is provided. The method includes receiving a set of training images and defining a first subset of training images of the set of training images. Training images in the first subset of training images are not labeled. The method also includes generating, from each training image in the first subset of training images, one or more image chips representing a portion of each training image and defining a region-of-interest and aggregating, from each training image in the first subset of training images, the one or more image chips into a set of image chips. For each image chip of the set of image chips, the method includes converting the image chip into an image vector and generating, by executing a first neural network using the image vector, a classification label that corresponds to the image chip. The method additionally includes training a second neural network using the set of image chips and classification labels. The second neural network, once trained, is configured to identify one or more targets within a new image.

According to another embodiment of the present invention, a method is provided. The method includes receiving, from an image sensor, an image and executing a first neural network using the image. The first neural network generates an identification of a plurality of locations-of-interest and a first classification label for each location-of-interest of the plurality of locations-of-interest. The method also includes executing a second neural network using a plurality of image chips derived from the plurality of locations-of-interest. The second neural network generates, for each image chip of the plurality of image chips, a second classification label for the image chip. The method further includes determining an identification of a set of targets within the image using the plurality of locations-of-interest, the corresponding first classification labels, the plurality of image chips, and the corresponding second classification labels and transmitting the identification of the set of targets within the image.

Another aspect of the present disclosure includes a system comprising one or more processors and a non-transitory computer-readable medium storing instructions, which when executed by the one or more processors, cause the one or more processors to perform the first method and/or the second method described above.

Another aspect of the present disclosure includes a non-transitory computer-readable medium storing instructions, which when executed by the one or more processors, cause the one or more processors to perform the first method and/or the second method described above.

Another aspect of the present disclosure includes a system comprising one or more processors and a non-transitory computer-readable medium storing instructions that when executed by the one or more processors, cause the one or more processors to receive a set of training images. The instructions may further cause the one or more processors to define a first subset of training images of the set of training images, wherein training images in the first subset of training images are not labeled. The instructions may further cause the one or more processors to generate, from each training image in the first subset of training images, one or more image chips representing a portion of each training image and defining a region-of-interest. The instructions may further cause the one or more processors to aggregate, from each training image in the first subset of training images, the one or more image chips into a set of image chips. For each image chip of the set of image chips, the instructions may cause the one or more processors to convert the image chip into an image vector, and generate, by executing a first neural network using the image vector, a classification label that corresponds to the image chip. The instructions may further cause the one or more processors to train a second neural network using the set of image chips and classification labels, wherein the second neural network, once trained, is configured to identify one or more targets within a new image.

In some embodiments, the first neural network is a self-organizing map. In some embodiments, the second neural network is a regions-based convolutional neural network (R-CNN). In some embodiments, the classification label that corresponds to the image chip is generated by determining a neuron of the first neural network that is closest to the image vector. Generating the classification label that corresponds to the image chip may also include identifying a label that corresponds to the neuron. In some embodiments, the classification label corresponds to the label that corresponds to the neuron.

In some embodiments, the first neural network is trained using semi-supervised learning. In some embodiments, the instructions further cause the one or more processors to train the first neural network by defining a second subset of the set of training images, each image in the second subset of the set of training images being unlabeled. Training the first neural network may also include executing an unsupervised learning phase using the set of training images, wherein the first neural network defines a temporary classification label for each training image in the second subset of the set of training images. Training the first neural network may also include defining a third subset of the set of training images, wherein each training image in the third subset of the set of training images is associated with a new classification label that was not defined by the first neural network. Training the first neural network may also include executing a supervised learning phase using the third subset of the set of training images and the new classification labels.

In some embodiments, the instructions further cause the one or more processors to execute the first neural network using the second subset of the set of training images, wherein the first neural network generates an updated classification label for each training image in the second subset of the set of training images. The instructions further cause the one or more processors to replace, for each training image in the second subset of the set of training images, the temporary classification label with the updated classification label. In some embodiments, each training image in the third subset of the set of training images are manually labeled.

In some embodiments, the instructions further cause the one or more processors to execute the second neural network using a particular image. The second neural network may generate an identification of one or more regions-of-interest and an identification of one or more potential targets within the particular image. The instructions may further cause the one or more processors to define a new set of image chips from the one or more regions-of-interest. The instructions may further cause the one or more processors to execute the first neural network using the new set of image chips, wherein the first neural network generates, for each image chip of the new set of image chips, a particular classification label for the image chip. The instructions may further cause the one or more processors to output, based on the identification of one or more potential targets and the particular classification label for each image chip of the one or more image chips, an identification of a set of targets within the particular image. In some embodiments, the region-of-interest is associated with a probability that the region-of-interest includes a representation of a target.

Another aspect of the present disclosure includes a system comprising one or more processors and a non-transitory computer-readable medium storing instructions that when executed by the one or more processors, cause the one or more processors to receive, from an image sensor, an image. The instructions may further cause the one or more processors to identify, by a first neural network, a plurality of locations-of-interest within the image. The instructions may further cause the one or more processors to generate, by the first neural network, a first classification label for each location-of-interest of the plurality of locations-of-interest. The instructions may further cause the one or more processors to extract, from the image, a plurality of image chips derived from the plurality of locations-of-interest. The instructions may further cause the one or more processors to generate, by a second neural network, a second classification label for each image chip of the plurality of image chips. The instructions may further cause the one or more processors to determine an identification of a set of targets within the image using the plurality of locations-of-interest, the first classification label for each location-of-interest of the plurality of locations-of-interest, the plurality of image chips, and the second classification label for each image chip of the plurality of image chips. The instructions may further cause the one or more processors to transmit the identification of the set of targets within the image.

In some embodiments, the first neural network is a regions-based convolutional neural network (R-CNN). In some embodiments, the second neural network is a self-organizing map. In some embodiments, the second neural network is trained using a first partially-unsupervised training phase and a second supervised training phase. In some embodiments, the second neural network is configured to generate a label for each of a set of training images, and wherein the first neural network is trained using the set of training images and corresponding label. In some embodiments, the instructions further cause the one or more processors to generate, for each image chip of the plurality of image chips, an image vector. In some embodiments, the instructions further cause the one or more processors to generate, for each image chip of the plurality of image chips, a two-dimensional map representative of the image chip, before executing the second neural network.

In some embodiments, the identification of the set of targets within the image is determined by determining, for a first subset of the first classification labels, that a confidence value associated with each of the first subset of the first classification labels, is greater than a first threshold. Determining the identification of the set of targets within the image may also include determining, for a second subset of the second classification labels, that a score associated with each of the second subset of the second classification labels, is greater than a second threshold. Determining the identification of the set of targets within the image may also include defining the set of targets to include targets represented at locations-of-interest corresponding to the first subset of the first classification labels, and targets represented in image chips corresponding to the second subset of the second classification labels. In some embodiments, the set of targets includes at least one overlapping potential target.

Another aspect of the present disclosure includes a non-transitory computer-readable medium storing instructions, which when executed by the one or more processors, cause the one or more processors to receive a set of training images. The instructions may further cause the one or more processors to define a first subset of training images of the set of training images, wherein training images in the first subset of training images are not labeled. The instructions may further cause the one or more processors to generate, from each training image in the first subset of training images, one or more image chips representing a portion of each training image and defining a region-of-interest. The instructions may further cause the one or more processors to aggregate, from each training image in the first subset of training images, the one or more image chips into a set of image chips. For each image chip of the set of image chips, the instructions may cause the one or more processors to convert the image chip into an image vector, and generate, by executing a first neural network using the image vector, a classification label that corresponds to the image chip. The instructions may further cause the one or more processors to train a second neural network using the set of image chips and classification labels, wherein the second neural network, once trained, is configured to identify one or more targets within a new image.

In some embodiments, the first neural network is a self-organizing map. In some embodiments, the second neural network is a regions-based convolutional neural network (R-CNN). In some embodiments, the classification label that corresponds to the image chip is generated by determining a neuron of the first neural network that is closest to the image vector. Generating the classification label that corresponds to the image chip may also include identifying a label that corresponds to the neuron. In some embodiments, the classification label corresponds to the label that corresponds to the neuron.

In some embodiments, the first neural network is trained using semi-supervised learning. In some embodiments, the instructions further cause the one or more processors to train the first neural network by defining a second subset of the set of training images, each image in the second subset of the set of training images being unlabeled. Training the first neural network may also include executing an unsupervised learning phase using the set of training images, wherein the first neural network defines a temporary classification label for each training image in the second subset of the set of training images. Training the first neural network may also include defining a third subset of the set of training images, wherein each training image in the third subset of the set of training images is associated with a new classification label that was not defined by the first neural network. Training the first neural network may also include executing a supervised learning phase using the third subset of the set of training images and the new classification labels.

In some embodiments, the instructions further cause the one or more processors to execute the first neural network using the second subset of the set of training images, wherein the first neural network generates an updated classification label for each training image in the second subset of the set of training images. The instructions further cause the one or more processors to replace, for each training image in the second subset of the set of training images, the temporary classification label with the updated classification label. In some embodiments, each training image in the third subset of the set of training images are manually labeled.

In some embodiments, the instructions further cause the one or more processors to execute the second neural network using a particular image. The second neural network may generate an identification of one or more regions-of-interest and an identification of one or more potential targets within the particular image. The instructions may further cause the one or more processors to define a new set of image chips from the one or more regions-of-interest. The instructions may further cause the one or more processors to execute the first neural network using the new set of image chips, wherein the first neural network generates, for each image chip of the new set of image chips, a particular classification label for the image chip. The instructions may further cause the one or more processors to output, based on the identification of one or more potential targets and the particular classification label for each image chip of the one or more image chips, an identification of a set of targets within the particular image. In some embodiments, the region-of-interest is associated with a probability that the region-of-interest includes a representation of a target.

Another aspect of the present disclosure includes a non-transitory computer-readable medium storing instructions, which when executed by the one or more processors, cause the one or more processors to receive, from an image sensor, an image. The instructions may further cause the one or more processors to identify, by a first neural network, a plurality of locations-of-interest within the image. The instructions may further cause the one or more processors to generate, by the first neural network, a first classification label for each location-of-interest of the plurality of locations-of-interest. The instructions may further cause the one or more processors to extract, from the image, a plurality of image chips derived from the plurality of locations-of-interest. The instructions may further cause the one or more processors to generate, by a second neural network, a second classification label for each image chip of the plurality of image chips. The instructions may further cause the one or more processors to determine an identification of a set of targets within the image using the plurality of locations-of-interest, the first classification label for each location-of-interest of the plurality of locations-of-interest, the plurality of image chips, and the second classification label for each image chip of the plurality of image chips. The instructions may further cause the one or more processors to transmit the identification of the set of targets within the image.

In some embodiments, the first neural network is a regions-based convolutional neural network (R-CNN). In some embodiments, the second neural network is a self-organizing map. In some embodiments, the second neural network is trained using a first partially-unsupervised training phase and a second supervised training phase. In some embodiments, the second neural network is configured to generate a label for each of a set of training images, and wherein the first neural network is trained using the set of training images and corresponding label. In some embodiments, the instructions further cause the one or more processors to generate, for each image chip of the plurality of image chips, an image vector. In some embodiments, the instructions further cause the one or more processors to generate, for each image chip of the plurality of image chips, a two-dimensional map representative of the image chip, before executing the second neural network.

In some embodiments, the identification of the set of targets within the image is determined by determining, for a first subset of the first classification labels, that a confidence value associated with each of the first subset of the first classification labels, is greater than a first threshold. Determining the identification of the set of targets within the image may also include determining, for a second subset of the second classification labels, that a score associated with each of the second subset of the second classification labels, is greater than a second threshold. Determining the identification of the set of targets within the image may also include defining the set of targets to include targets represented at locations-of-interest corresponding to the first subset of the first classification labels, and targets represented in image chips corresponding to the second subset of the second classification labels. In some embodiments, the set of targets includes at least one overlapping potential target.

Utilizing embodiments of the present invention, the neural network described herein enables the production of output covering the range of actions from detection to classification to recognition to identification. Thus, the output of the systems described herein can be dependent on the number of pixels associated with the target. As an example, for stationary targets, target detection can be performed using as little as 50 pixels associated with the target, while target recognition may be performed using approximately 400 pixels associated with the target. Thus, embodiments of the present invention provide different outputs from detection to identification depending on range to the target, which determines the number of pixels associated with the target based on the sensor resolution and optical system.

As examples of the automatic target detection, classification, recognition, identification, and/or fingerprint processes, the following Table illustrates the output in view of the level of detail.

| System Process | Example Output |
| --- | --- |
| Detection | Target vs. Clutter |
| Classification | Tracked vs. Wheeled (If Target) |
| Recognition | Tank vs. APC (If Tracked) |
| | Truck vs. Scout (If Wheeled) |
| Identification | M60 vs. T72 (If Tank) |
| | M35 vs. Zil (If Truck) |
| Fingerprint | Particular Vehicle (If Identified) |

Numerous benefits are achieved by way of the present invention over conventional techniques. For example, embodiments of the present invention include a neural network augmented with a self-organizing map classifier. The neural network can automatically detect targets (e.g., objects) within an image. The self-organizing map classifier may be used to supplement labeling of training images for the neural network. Since fewer images are labeled by users, the training images and corresponding images needed to train the neural network may be obtained much faster with fewer mislabeled images. During operations, the self-organizing map receives regions-of-interest from an object-detecting neural network and generates labels and confidences in parallel to the neural network. The use of labels and confidences from both the object-detecting neural network and the self-organizing map may substantially increase the accuracy of object identification.

Further areas of applicability of the present invention will become apparent from the detailed description provided hereinafter. It should be understood that the detailed description and specific examples, while indicating various embodiments, are intended for purposes of illustration only and are not intended to necessarily limit the scope of the disclosure.

8

FIG. 6 depicts an example flowchart illustrating a process for executing a target-detection neural network to identify targets within images according to certain embodiments of the present disclosure.

Figure 7:
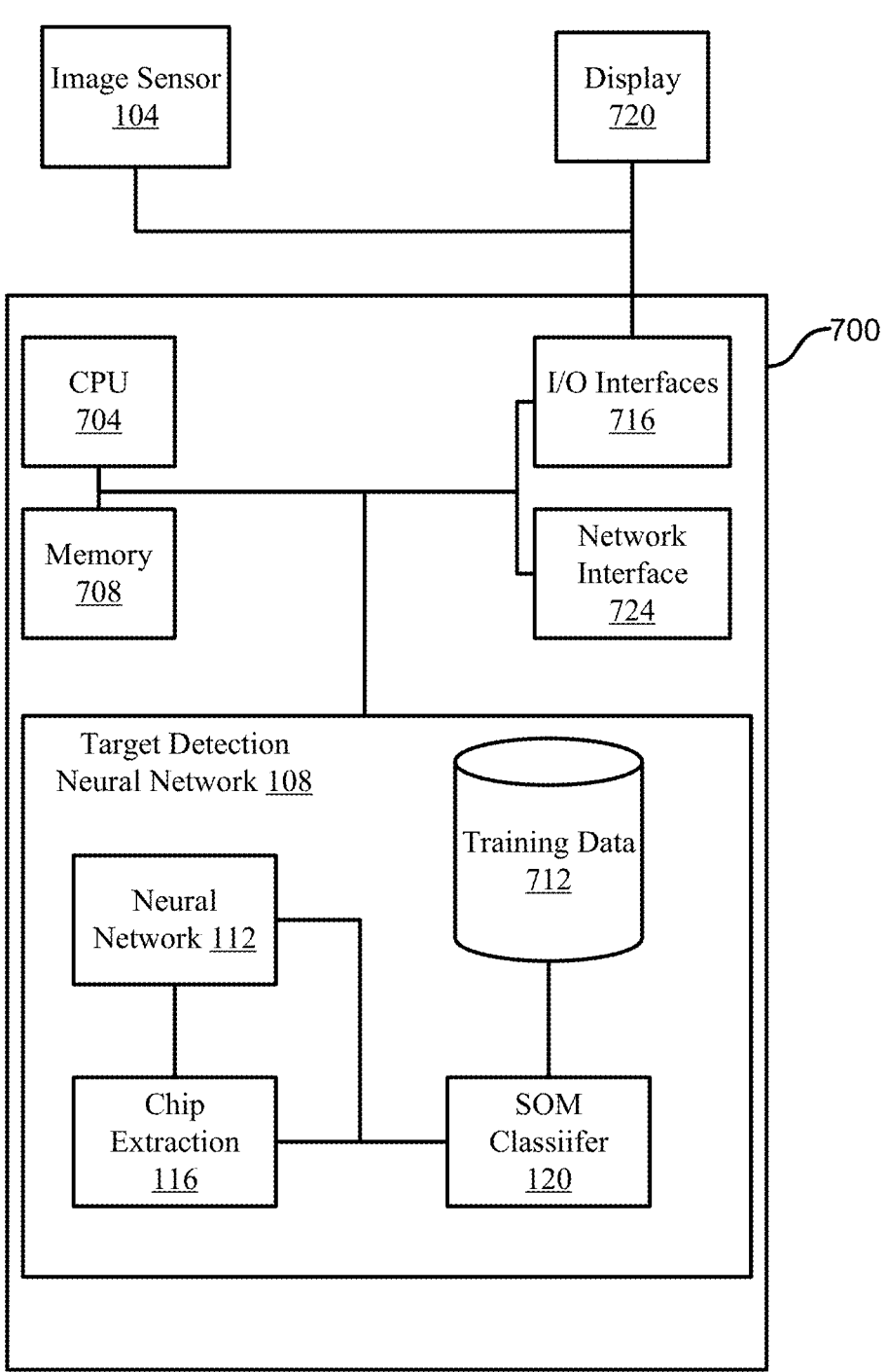

FIG. 7 depicts an example block diagram of an electronic device training and/or executing a target-detection neural network according to certain embodiments of the present disclosure.

DETAILED DESCRIPTION OF SPECIFIC EMBODIMENTS

The methods and systems described herein involve a neural network augmented with a self-organizing-map (SOM) classifier that can identify objects within an image. The SOM classifier augments both training and execution of the neural network to improve the accuracy of the neural network in identifying objects within images. For instance, during training, the SOM classifier increases the number of training images that may be used to train the neural network. For instance, training the neural network may require a predetermined quantity of labeled images with, for example, the label indicating the presence of a particular object of interest or an absence of objects. Since the labels are typically manually generated, obtaining the requisite quantity of images may include a laborious process of reviewing and labeling a very large quantity of images. The SOM classifier may receive a small portion of labeled images and generate labels for the remaining images. As a result, the SOM classifier may increase the speed at which training images may be obtained and used to train the neural network. This may also increase the rate at which the neural network may be trained to classify and identify new object types as new training images may be obtained quickly with little manual labelling.

During execution of the neural network, the SOM classifier may execute in parallel with the neural network to generate labels for regions-of-interest (ROIs) within an input image. The output of the neural network (e.g., a label and a corresponding confidence indicating a degree with which the label is believed to be correct for each ROI) and the output of the SOM classifier (e.g., a label and corresponding confidence for each ROI) may be aggregated and sorted. For each ROI, the labels having a confidence over a predetermined threshold may be output. The augmented neural network (e.g., the neural network executing with the SOM classifier in parallel) may result in a higher labelling accuracy.

In one example, a computing device may receive an untrained neural network and an untrained SOM classifier. The untrained neural network may be a convolutional neural network (CNN), a regions-based CNN (R-CNN), Faster R-CNN, or the like. The SOM classifier may be trained first in a two-stage process. During the first stage, the SOM classifier may be trained using unsupervised learning using a set of training images. The set of training images may then be segmented into two subsets. The first subset of the training images may include labels generated by the SOM classifier during the unsupervised learning and the second subset of the training images may include manually generated labels. During the second stage, the SOM classifier may be trained using supervised learning based on the first subset of training images and corresponding labels generated by the SOM classifier and the second subset of training images and the corresponding labels that were manually generated. During the second stage, the SOM classifier updates the labels for each image. Partitioning training into a two-stage process including a supervised learning stage and an unsupervised learning stage may be considered to have been trained using semi-supervised learning. The computing device may calculate the recall of the neural network. Recall is the number of true positives (e.g., correct labels generated by the SOM classifier) divided by the number of true positives plus the number of false negatives. The SOM classifier may then be evaluated to determine the accuracy of the now-trained SOM classifier. If the accuracy of the trained SOM classifier is greater than a threshold, the process continues to train the neural network. If the accuracy of the trained SOM classifier is not greater than the threshold, the SOM classifier may be retrained.

The first subset of training images and corresponding labels generated by the SOM classifier and the second subset of training images and the corresponding labels may be used to train the neural network. The neural network may be trained using supervised learning. The neural network may be trained using the full set of training images (e.g., the first subset of training images plus the second subset of training images). In this example, only images of the second subset of training images were manually labeled. The first subset of training images were labeled by the SOM classifier during training of the SOM classifier. As a result, the neural network may be trained using a faction of images that were manually labeled.

Once the neural network and the SOM classifier are trained, the computing device may begin live object identification using an image sensor. In one example, the image sensor may be an infrared sensor such as a midwave infrared sensor or a longwave infrared sensor. The computing device executes the trained neural network using an image from the image sensor as input. The neural network may first identify a set of regions-of-interest (ROIs) within an image. An ROI may be an area within the image that includes an object-of-interest. The neural network may output the set of ROIs and continue processing the image. The computing device may extract image chips from the ROIs. The image chips may be of a predetermined area (e.g., such as 20×40 pixels or the like). The computing device then executes the SOM classifier using the image chips as input. The SOM classifier may execute in parallel with the neural network.

The neural network may generate a label for each ROI along with a confidence that indicates the likelihood that the label is correct. The SOM classifier may also generate a label and a confidence for each image chip. The computing device aggregates the labels and corresponding confidences from the neural network and the SOM classifier. In some instances, for each ROI, the computing device may combine the confidences generated by the neural network and the SOM classifier. The computing device may then sort the ROIs based the confidences of each label assigned to the ROIs. The computing device may then output the ROIs that have labels with high confidences. For instances, the computing device may define a confidence threshold. The computing device may output the ROIs and corresponding labels that have a confidence that is greater than the confidence threshold.

In some instances, outputting the ROIs may include displaying the ROIs (with the corresponding labels and confidences) on a display device of the computing device. In other instances, outputting the ROIs may include transmitting an identification of the ROIs with the corresponding labels and confidences to a remote device such as a server, a database, or the like. In still yet other instances, outputting the ROIs may include transmitting a label and the confidence to a weapons platform. For instance, in a military application, the augmented neural network may classify and identify targets within images. The computing device may output the classification or identification of the target to a weapons platform. The weapons platform may automatically or with operator final decision interaction generate options to intercept the target.

Figure 1:
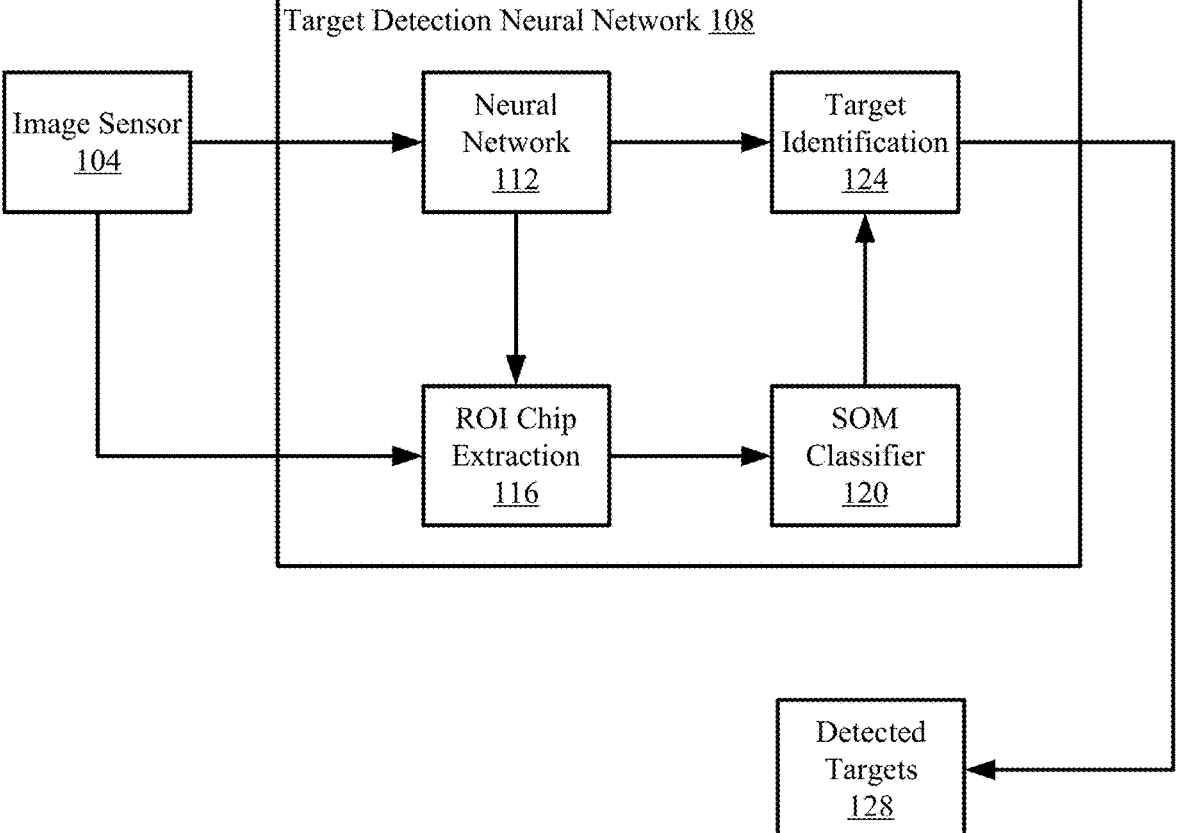
FIG. 1 depicts an exemplary block diagram illustrating a target-detection neural network according to some embodiments of the present disclosure.

FIG. 1 depicts an exemplary block diagram illustrating a target-detection neural network according to some embodiments of the present disclosure. Image sensor 104 generates image data for target-detection neural network 108. Image sensor 104 may utilize an infrared detector such as a microbolometer, a charge-coupled device (CCD), an active-pixel sensor (e.g., a complementary metal-oxide-semiconductor based sensor), or the like. Image sensor 104 may generate image data from detected electromagnetic waves (e.g., light, radiation, etc.). In some instances, the electromagnetic waves may include wavelengths that are not visible to humans such as infrared waves (e.g., midwave infrared with wavelengths of 3-8 μm, longwave infrared with wavelengths of 8-15 μm, or the like), ultraviolet waves, or the like. In other instances, the electromagnetic waves may have a wavelength that is visible to humans (e.g., with wavelengths of 400-700 nm). The image data may be represented as an image (e.g., the image data may be rendered on a display device) or as a data structure.

The image data from image sensor 104 is received by target-detection neural network 108. The image data can be referred to as full frame images, which can be compared to image chips having an image size smaller than the full frame as described more fully below. Full image frame resolutions can be 640×480, 1280×720, 1920×1080, or the like. Target-detection neural network 108 may be implemented using a computing device that includes a system of interconnected neural networks that operate together to detect targets (e.g., object of interest) within the image data. Target-detection neural network 108 may execute neural network 112 using the image data. Neural network 112 may be a CNN (or an R-CNN, faster R-CNN, or the like). Neural network 112 may first define a set of locations of interest within the image data. Neural network 112 may also define a set of regions of interest (ROIs) corresponding to each location of interest. Each ROI may correspond to a portion of the image data within which an object-of-interest may be located. For CNNs, the ROIs may be selected based on the resolution of the image data. For example, a predetermined quantity of ROIs may be selected from the image data based on the resolution of the image data with each ROI having dimensions that are smaller than the image data.

In some instances, the locations of interest or ROIs may be dynamically determined by neural network 112. For example, neural network 112 may use a selective search algorithm on the image data to define the ROIs. Using a selective search algorithm, neural network 112 may define ROIs that correspond to areas of the image data that are likely to correspond to an object-of-interest. Neural network 112 may define a predetermined quantity of ROIs. Some ROIs may overlap with other ROIs. In some instances, neural network 112 may process the overlapping ROIs separately. In other instances, neural network 112 may combine overlapping ROIs to reduce the quantity of ROIs that are to be processed. In some embodiments, the locations of interest associated with each of the ROIs can be referred to as detection locations, signifying the location at which an ROI is detected.

It should be noted that in some implementations, the locations of interest may be identified, but not actually associated with a target, resulting in a false alarm. As described more fully herein, although a large false alarm rate may be associated with the locations of interest detected by neural network 112, these erroneous locations of interest may be removed during subsequent processing using results produced by SOM classifier 120.

Neural network 112 may output the locations of interest to ROI chip extraction 116 for parallel processing by SOM classifier 120 while continuing to process the ROIs. Neural network 112 may include one or more convolution layers that process the image data of an ROI. The convolution layers may operate in series with the output of one layer being used as input to the next layer. A first convolution layer may receive the portion of image data that corresponds to an ROI as input (e.g., a matrix with each cell corresponding to pixel information). The first convolution layer may then convolve the portion of the image data using a kernel and optionally a bias value. The first convolution layer may then output the result to a subsequent convolution layer (if present) or a pooling layer (if the first convolution layer is the last convolution layer). The output may be a convolved matrix that is of smaller dimensions than the input matrix. In one example, neural network 112 may include three convolution layers. The pooling layer reduces the data size of the matrix output from the previous convolution layer. In some instances, average pooling may be performed in which the values of each N×N area of the output matrix are replaced with a single cell corresponding to the average of those values. In other instances, max pooling may be performed in which the values of each N×N area of the output matrix are replaced with a single cell corresponding to the maximum value of the values. Neural network 112 may then execute an activation function (e.g., a rectified linear unit) that affects cells with values greater than zero.

The output from the previous layers may be flattened (e.g., converted into a single dimensional feature vector) and passed to a fully connected layer for classification. The output of the fully connected layer, for example, neural network 112, may be a value (e.g., a confidence) that corresponds to the likelihood that the location of interest corresponds to each possible label (e.g., an indication of an object-of-interest from a set of possible objects-of-interest). If neural network 112 is configured to label locations of interest according to 10 different object types, then the output may include 10 values, one per label that corresponds to an object type. In some instances, a normalization algorithm may be applied such as a softmax or the like to normalize the output from the fully connected layer.

Thus, in the embodiment illustrated in FIG. 1, neural network 112 provides output that includes one or more locations of interest, one or more labels associated with each of the one or more locations of interest, and, for each of the one or more labels, a confidence, also referred to as a confidence value, that the label for the corresponding location of interest is accurate or correct. Neural network 112 also outputs the one or more locations of interest to ROI chip extraction 116 for use in defining ROIs corresponding to the one or more locations of interest. One of ordinary skill in the art would recognize many variations, modifications, and alternatives.

Since neural network 112 operates on the image data (i.e., a full frame image), the confidence associated with each label that is produced using neural network 112 can be normalized using parameters of the generalized extreme value (GEV) distribution.

Neural network 112 may determine if the label having the highest confidence is characterized by a confidence greater than a threshold. If the label having the highest confidence is characterized by a confidence greater than the threshold, then the neural network assigns the label having the highest confidence to the location of interest to indicate that an object having the object type of the label is within the ROI. If the label having the highest confidence is not characterized by a confidence greater than the threshold, then neural network 112 indicates that no object is contained within the ROI. Neural network 112 may output the location of interest, the label having the highest confidence, and the corresponding confidence to target identification 124. In some instances, neural network 112 may output confidences of each label in addition to the label having the highest confidence to target identification 124. Neural network 112 may then repeat the process for each location of interest and corresponding ROIs such that target identification 124 may receive at least one label and corresponding confidence for each location of interest and corresponding ROI.

The set of locations of interest output from neural network 112 may be received by ROI chip extraction 116 while neural network 112 begins processing the ROIs. ROI chip extraction 116 defines an image chip corresponding to each location of interest, resulting in a set of image chips for the set of locations of interest. Each image chip, which may also be referred to as a chip or a sub-image, may have a predetermined dimensions (N×I) (e.g., such as 20×20 pixels, 40×20 pixels, 80×40 pixels, etc.). In some instances, each image chip may correspond to an N×I set of pixels centered on the pixel of the location of interest. However, this is not required and other methods of defining image chips for locations of interest can be utilized in accordance with embodiments of the present invention. In other instances, the ROIs may be first processed (e.g., convolved using a predetermined kernel, pooled, filtered using a Fourier domain filtering or the like, image padding, affine transformations, and/or the like) before the image chips are output by ROI chip extraction 116. Each image chip may be flattened into an input vector.

As illustrated in FIG. 1, ROI chip extraction 116 may receive the full image from image sensor 104. ROI chip extraction 116 may then define one or more image chips using the full image. Using the locations of interest provided by neural network 112, ROI chip extraction 116 defines image chips covering a corresponding ROI as discussed herein. In other instances, the identification of locations of interest may be received externally from target-detection neural network 108 (e.g., from a computing device, user input, another neural network, etc.). In still yet other instances, ROI chip extraction 116 may not receive locations of interest. In those instances, ROI chip extraction 116 may define image chips from the full image or image chips can be provided via alternative means to SOM classifier 120.

The image chips produced using ROI chip extraction 116 are passed to SOM classifier 120. Self-organizing maps may be a two-layered neural network that includes an input layer (e.g., a feature vector) and an output layer (e.g., a X×Y matrix of neurons). Each neuron (of the output layer) includes a weight vector. During (unsupervised) learning, SOM classifier 120 computes the distance between each neuron and an input feature (e.g., $X_i$), of the input layer. The weight vector of the neuron having the smallest distance may be updated. SOM classifier 120 may also update the weight vectors of neighboring neurons (to a lesser degree further from the neuron having the smallest distance). The process then continues to the next feature $X_{i+1}$. This process may be repeated for multiple (or all) input features until SOM classifier 120 is trained. SOM classifier 120 may also undergo supervised learning in which labels may be assigned to some image chips to teach SOM classifier 120 to distinguish between image chips that contain an object-of-interest from image chips that include clutter (e.g., no object of interest).

Once SOM classifier 120 is trained, neural network 112 may begin analyzing input images to detect objects-of-interest. Neural network 112 may output ROIs from the images during the process of detecting objects-of-interest. The neural network may receive image chips that correspond to images for which object detection is being performed by the neural network to generate a label for each image chip that indicates that the image chip contains an object-of-interest or clutter. In some instances, the label may also indicate the object type from a set of possible object types that are within the image. SOM classifier 120 may output the label and a corresponding confidence that the label is accurate to target identification 124. This corresponding confidence is referred to as a score and indicates the likelihood that the image chip contains the object-of-interest corresponding to the particular label class after classification by the SOM classifier 120.

Target identification 124 may process the labels and scores for each location of interest received from neural network 112 and the labels and score for each ROI received from SOM classifier 120 and output a list of detected targets within image data. For example, target identification 124 may first aggregate the confidences associated with each location of interest and the scores associated with each ROI. These confidences/scores can also be associated with each ROI and corresponding image chip (e.g., the image chips extracted from the image data and centered at the locations of interest). The confidences/scores may be averaged, normalized, or otherwise weighted during aggregation. In one classification process, the class with the highest score is selected for each ROI.

Target identification 124 may then sort the locations of interest according to the confidence associated with each location of interest, which can correspond to an image chip. In some instances, locations of interest that are labeled as clutter may be removed from the list. Target identification 124 may determine if the confidence of the location of interest is greater than a threshold to prevent instances in which a low confidence of clutter causes a location of interest to be removed. Target identification 124 may then output a list of detected targets 128 that includes the locations of interest, corresponding labels, and corresponding confidences.

As an example, if the neural network 112 and the SOM classifier both produce the same label for a particular location of interest and corresponding ROI, then the confidence value and the score can be aggregated. If, on the other hand, the neural network 112 produces a label associate with a target of interest and the SOM classifier produces a classification of the ROI as clutter with a given score S, then (1-S) can be used as the possibility that the ROI includes a target, and (1-S) can be aggregated with the confidence value produced by the neural network 112. Thus, the aggregated value (e.g., the sum) of the confidence values and the scores is provided as an output of the target-detection neural network 108. In some embodiments, the score produced by the SOM classifier 120 can be normalized using the GEV distribution associated with the full image.

Using embodiments of the present invention, the advantages provided by neural network 112, for example, processing speed, are combined with the advantages provided by SOM classifier 120, for example, adaption to resolve background variation and identifying clutter, to implement a system with performance exceeding conventional systems. Thus, considering each system alone, the processing speed of neural network 112 is utilized to analyze complete images while SOM classifier 120 is utilized to analyze lower resolution image chips while providing a low false alarm rate for images with background variations.

Detected targets 128 may be presented via one or more devices. For instance, detected targets 128 may be stored in a database for later use, transmitted to a server or other remote device, transmitted to a weapons platform for automatic target interception, displayed via a display device, stored (e.g., in a local or remote database, etc.), combinations thereof, or the like.

Figure 2:
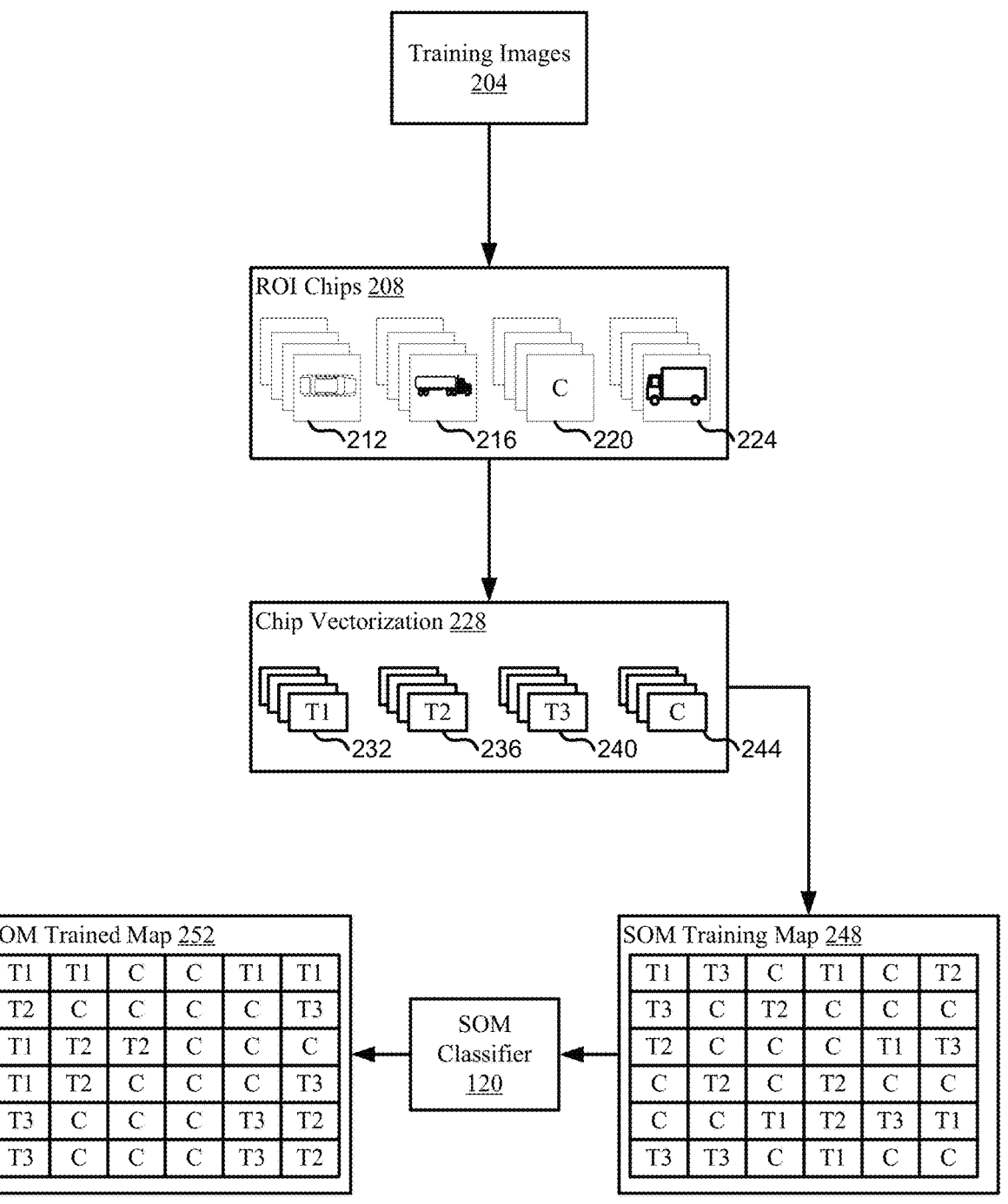
FIG. 2 depicts an example block diagram for training a SOM classifier according to certain embodiments of the present disclosure.

FIG. 2 depicts an example block diagram for training a SOM classifier according to certain embodiments of the present disclosure. SOM classifier 120 may be trained by an unsupervised-learning process followed by a supervised learning process. The process may begin by receiving training images 204. The images may include one or more representations of objects-of-interest or clutter (e.g., no object-of-interest). The objects-of-interest may correspond to a class of objects for which SOM classifier 120 may be used for later detection. For a target detection application, the training images may be collected using an infrared camera (e.g., a shortwave infrared, midwave infrared, longwave infrared, etc.). Training images 204 may include a set of images for each target type. For instance, training images 204 may include a set of unlabeled images that correspond to pickup trucks (e.g., such as non-standard tactical vehicles or "technicals"), a set of images that correspond to a BTR-70 (e.g. a type of armored personnel carrier), a set of images that correspond to a BMP-2 (e.g., a type of amphibious infantry vehicle), etc. The SOM classifier 120, once trained, may then classify an unknown vehicle as being a pickup truck, a BTR-70, a BMP-2, etc. Training images 204 may include a set of unlabeled images for each of any number of objects-of-interest for which SOM classifier 120 is to be used to detect objects-of-interest.

The set of images for an object-of-interest may include representations of the object-of-interest in different contexts to ensure SOM classifier 120 will be able to detect the object-of-interest in varying contexts. Returning to the target detection example, the set of images that include representations of pickup trucks may include a subset of images that represent pickup trucks in daylight at a first distance (1000 meters) from the camera, a subset of images that represent pickup trucks in daylight at a second distance (1500 meters) from the camera, a subset of images that represent pickup trucks in daylight at a third distance (2000 meters) from the camera, a subset of images that represent pickup trucks at night at the first distance from the camera, a subset of images that represent pickup trucks at night at the second distance from the camera, a subset of images that represent pickup trucks at night at a third distance the from the camera, etc. Once trained, SOM classifier 120 may then be configured to detect a pickup truck at any distance from 0-2000 meters in daylight or at night. In some instances, the set of images for an object-of-interest may also include images of an object-of-interest with varying weather phenomenon or visibility conditions (e.g., fog, rain, snow, haze, pollution, etc.) to train SOM classifier 120 to detect objects-of-interest even in such conditions. Though three distances and a small set of weather phenomenon and visibility conditions were enumerated above, each set of images of an object-of-interest may include images at any number of distances or in various weather and visibility conditions. In addition, the difference in distances between the first distances, second distance, third distance, etc. may be of any length.

During the first phase of training, SOM classifier 120 may be trained using unsupervised training. This means the training data used for the first phase of training is unknown to SOM classifier 120 during training (e.g., for each image, SOM classifier 120 does not receive an indication as to whether the image includes an object-of-interest or clutter or an identification of the object-of-interest represented in an image if the image does include an object-of-interest). SOM classifier 120 learns to distinguish between images and contents thereof solely based on the images themselves. In some instances, though SOM classifier 120 may not receive a label that corresponds to a training image during the first phase of training, a portion of the training images may be labeled to ensure that a sufficient quantity of images are available for each object-of-interest and for each context to train SOM classifier 120. During the second phase of training, SOM classifier 120 may receive labels for a portion of the training images that may be used in learning labels for the training images. SOM classifier 120 may then generate labels for the remaining, unlabeled portion of the training images. In other instances, the training images may not be labeled until the second phase of training begins. In those instances, it may be unknown how many images of each object-of-interest may be included in training images 204.

The training images from training images 204 are passed to ROI chips 208. ROI chips 208 generates a set of image chips for each image. Each image chip may correspond to a ROI in a training image. An ROI may be a region of an image that likely includes an object-of-interest.

An image chip may correspond to an NxI pixel portion of the training image. In some instances, an image chip may correspond to a 20×40 pixel portion of the training image. In other instances, an image chip may correspond to 20×20 pixels, 40×20 pixels, 40×40, 80×40 pixels, or the like. Each image chip may include clutter, a portion of an object-of-interest, and/or an entire object-of-interest. In the target detection example, ROI chips 208 may generate a set of image chips that correspond to vehicles. For example, ROI chips 208 may generate a set of image chips representative of, but not limited to, each of: a car 212, a tanker 216, clutter 'C' 220, and a truck 224. Though four sets of image chips are shown, ROI chips may generate any number of sets of image chips in addition to or in place of those shown. In some instances, ROI chips 208 may generate a set of image chips for each object-of-interest and a set of image chips that corresponds to clutter and optionally, a set of image chips that are unknown, could be an object-of-interest or clutter. In other instances, ROI chips 208 may generate a set of image chips that is random (e.g., includes an unknown quantity of each object-of-interest class).

The sets of image chips are passed to chip vectorization 228, where each image chip is converted into an image vector representative of the image chip. An image vector may include an ordered set of features extracted from an image chip. This enables an entire image to be represented by a discrete dataset of ordered features. In some instances, each pixel of an image chip may include a set of features (e.g., a red value, a green value, a blue value, an intensity value, etc.) and an identifier (e.g., an integer between 1 and 800 for a 20×40 pixel image). To reduce the complexity of the set of features of a pixel, the image chip may be converted to a single value. In some instances, the color values (e.g., each being represented as an integer between 0 and 255) may converted to a single color value (e.g., an integer between 0 and 16,777,215 in which each integer represents a particular color value). In other instances, the color values may be converted to a grayscale value (e.g., an integer between 0 and 255). For example, if each pixel includes a single feature, an image vector for an image chip that is 20×40 pixels may include 800 features and an image vector for an image chip that is 80×40 pixels may include 3,200 features. The image vector may represent each feature in an order based on the pixel identifier (e.g., the set of pixel features for pixel 1 followed by the set of pixel features for pixel 2 all the way to the set of pixel features for pixel 800). Returning to the target detection example, chip vectorization 228 may generate a set of image vectors (e.g., one for each image chip) from image chips that represent a car 212 (e.g., labeled as target 1 or T1 232), a set of image vectors from image chips that represent a tanker 216 (e.g., labeled as target 2 or T2 236), a set of image vectors from image chips that represent a truck 224 (e.g., labeled as target 3 or T3 240), and a set of image vectors from image chips that represent clutter 220 (e.g., labeled as C 244), and (optionally), a set of image vectors that correspond to unknown objects.

The sets of image vectors may be aggregated to form SOM training map 248 that has dimensions (X,Y). Each image vector may occupy a position $(X_i, Yi)$ within SOM training map 248. In some instances, SOM training map 248 may have a random initial orientation (e.g., each image vector may be randomly assigned a position within SOM training map 248) using a random number generator or the like. Alternatively, image vectors may be sorted within SOM training map 248 based on labels (if known) or commonalities between image vectors. For instance, if image vectors for an object-of-interest can be identified, then those images vectors may be clustered together within SOM training map 248.

SOM training map 248 may be passed to SOM classifier 120 to train SOM classifier 120. SOM classifier 120 initializes a map (e.g., SOM training map 248) that includes a set of neurons in a predetermined orientation. Each neuron may represent an image vector. SOM classifier 120 may assign each image vector in SOM training map 248 a weight vector that may have the same dimensions as an image vector. The weight vectors of each image vector may be initialized with random values (e.g., using a random number generator or the like). During the first phase of (unsupervised) training, SOM classifier 120 may use an input vector (or any object-of-interest class) and compute a distance between each neuron and the image vector of the input layer. The weight vector of the neuron having the smallest distance may be updated. SOM classifier 120 may also update weight vectors of neighboring neurons. SOM classifier 120 may update weight vectors of immediate neighbors first. SOM classifier may continue to update weight vectors of neighbors that are further from the neuron having the smallest distance with the weight vector of each neighbor being updated to a lesser degree the further from the neuron having the smallest distance. For example, neuron $(Y_i, Z_i)$ may be the neuron having the smallest distance to the image vector $X_i$. SOM classifier 120 may update the weight vector of the neuron at $(Y_i, Z_i)$ first. Then, SOM classifier 120 may update neurons: $(Y_{i+1}, Z_i)$, $(Y_{i-1}, Z_i)$, $(Y_i, Z_{i+1})$, $(Y_i, Z_{i-1})$, $(Y_{i+1}, Z_{i-1})$, $(Y_{i+1}, Z_{i+1})$, $(Y_{i-1}, Z_{i+1})$, $(Y_{i-1}, Z_{i-1})$, but to a lesser degree. SOM classifier 120 may update neurons that are still further from $(Y_i, Z_i)$, but to an even lesser degree. This process may continue until the degree in which a neuron is to be updated is equal to or otherwise approaches zero (e.g., the neuron is so far from $(Y_i, Z_i)$ that the degree in which it is to be updated is zero and as such will not be updated).

Since SOM classifier 120 has been trained up to this point using unsupervised learning, SOM classifier 120 may not have labels for object-of-interest classes and as such may be unable to determine which input image vector corresponds to which object-of-interest class. However, SOM classifier 120 may determine that an input image vector is similar to image vectors of one or more neurons and likely corresponds to a same object-of-interest class as an object-of-interest class of the one or more neurons (though the particular object-of-interest class may be unknown). For example, SOM classifier 120 may determine that an image depicts a same object as depicted by one or more neurons without knowing an identification of that object. In particular, SOM classifier 120 may identify neurons that have similar properties and determine that those neurons may correspond to a same object-of-interest class. For example, SOM classifier 120 may identify neurons that correspond to a first unknown object-of-interest and label those neurons with a temporary classification label (e.g., target 1 or as illustrated in FIG. 2, T1), etc.

SOM classifier 120 may be trained using a set of image vectors that includes a predetermined quantity of image vectors for each object-of-interest class (e.g., target 1, target 2, target 3, clutter, and unknown) to ensure that SOM classifier 120 can determine an object class for an unknown image vector. In some instances, training may continue until a predetermined quantity of image vectors are input to and processed by SOM classifier 120. In other instances, training may continue until a degree in which a weight vector of a closest neuron is updated by less than a threshold amount. For instance, if the weight vector of a neuron is already close to an image vector then it can be determined that the SOM classifier 120 may be sufficiently trained. In other instances, SOM classifier 120 may be trained using a combination of a threshold quantity of image vectors input to and processed by SOM classifier 120 and a determination is made that weight vectors are being updated by less than a first threshold amount. For instance, SOM classifier may be trained using a threshold quantity of image vectors. Training may then continue until a predetermined quantity of neurons are updated by less than a second threshold amount. This may ensure that a single image vector that may be a coincidentally close match to a neuron does not prematurely halt training. In still yet other instances, SOM classifier 120 may be trained until a predetermined accuracy is achieved. For instance, after every N training image vectors are input, a set of image vectors with known labels may be provided for classification by SOM classifier 120. SOM classifier 120 may identify a neuron that is closest to an image vector. It can be determined whether the identified neuron corresponds to the known label. An accuracy metric may be determined based on the percentage of the image vectors having labels that correspond to the correctly identified neuron. If the accuracy metric is greater than a third threshold, then the first phase of training may terminate. If the accuracy metric is not greater than the third threshold, the first phase of training may continue with another N training image vectors.

In other instances, cross-validation cuts of input image vectors may be defined for training and for testing. For instance, a training set of image vectors and a testing set of image vectors from the set of image vectors may be defined. The training set of image vectors and the testing set of image vectors may include randomly selected image vectors from the set of image vectors. The training set of image vectors and the testing set of image vectors may not overlap (e.g., the training set of image vectors does not include image vectors included in the testing set of image vectors). The testing set of image vectors may include labels. The training set of image vectors and the testing set of image vectors may be processed by SOM classifier 120 to provide a statistical (e.g., cross-validation) indication of an accuracy of SOM classifier 120.

Before the first phase of training, the initial map of SOM classifier 120 may appear as SOM training map 248 (e.g., with the image vectors of each object-of-interest) class being clustered together). By updating the weights of each image vector during training, the position of image vectors of the map may be pulled towards the input image vectors. This may cause the image vectors of the map to shift. SOM trained map 252 represents the appearance of the map after the first phase of training. SOM trained map 252 may be structured according to the underlying features in each image vector. Image vectors that are similar may appear closer to each other. SOM trained map 252 as shown depicts some object-of-interest classes being separated. As previously noted, the map includes objects-of-interest in each of a variety of contexts (e.g., during the day, at night, at different distances, different visibilities, etc.). SOM training map 252 may include clusters of objects-of-interest based on a same context (e.g., image vectors that correspond to cars, T1, at night may be clustered near each other and next to tankers at night) due to the similarity of properties of the respective image vectors.

Once the first phase of training is completed, a second (supervised) training phase may begin. During the second phase, labels for some image vectors may be passed to SOM classifier 120. In some instances, the second training phase may include the use of labels for a percentage of the image vectors (e.g., 3%, 5%, 10%, 20%, or any other predetermined percentage). The image vectors may be new image vectors or may correspond to image vectors that are within the SOM trained map 252. SOM classifier 120 may learn the labels for each object-of-interest class. For example, in the target detection example, SOM classifier 120 may receive a labeled image vector that has a closest neuron that corresponds to T1. SOM classifier 120 may then assign the label of the labeled image vector (e.g., car) to the neurons labeled with T1. Stated differently, SOM classifier 120 may replace a temporary classification label with an updated classification label. SOM classifier 120 may receive a labeled image vector that corresponds to each object-of-interest class (e.g., car, tanker, truck, and clutter) such that SOM classifier 120 may determine that the label car corresponds to T1 232, the label corresponds to tanker T2 236, the label truck corresponds to T3 240, and the label clutter corresponds to C 244. During execution, an unknown input image vector may be input to SOM classifier 120. SOM classifier may identify the neuron that is closest to the input image vector and assign the label of that neuron to the input image vector thereby classifying the input image vector.

Alternatively, or additionally, the received labels may be used during post-processing of the output from SOM classifier 120. In that instance, the image vectors of SOM trained map 252 may not be assigned labels. Instead, a correspondence may be made between the set of neurons that correspond to a same object-of-interest class (e.g., as determined by SOM classifier 120) and a label assigned to a neuron of the set of neurons. During execution of SOM classifier 120, SOM classifier 120 may return an identification of a particular neuron that is closest to an input image vector. A lookup may be performed to identify the label of the set of neurons for which the particular neuron is a member. The identified label may then be assigned to the input image vector thereby classifying the input image vector.

Figure 3:
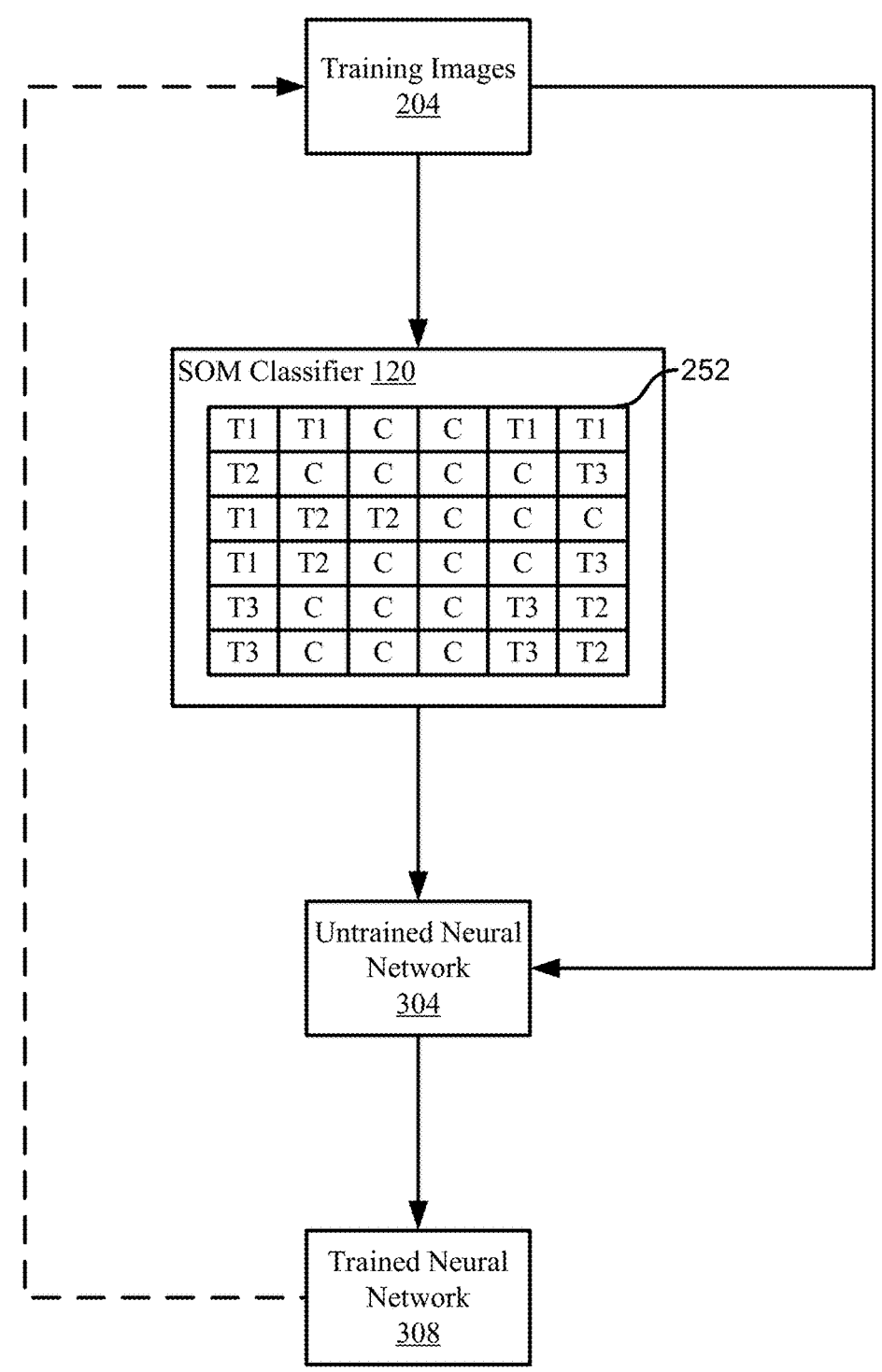
FIG. 3 depicts an example block diagram for training a neural network for target detection using reduced or minimal manual labeling according to certain embodiments of the present disclosure.

FIG. 3 depicts an example block diagram for training a neural network for target detection using reduced or minimal manual labeling according to certain embodiments of the present disclosure. Once SOM classifier 120 is trained (e.g., both the first phase of training and the second phase of training are complete), SOM classifier 120 may be used in the training of a neural network configured to detect objects-of-interest such as neural network 112. For example, neural network 112 may be a convolutional neural network (e.g., CNN) configured to be trained with supervised learning using a same or similar set of images (e.g., training images 204) used to train SOM classifier 120. During supervised learning, neural network 112 may process a training image with a corresponding label indicating an object-of-interest depicted in the training image. SOM classifier 120 may be used to label training images for neural network 112 to reduce the time and costs associated with manually labeling each training image. Since SOM classifier may be trained using only a portion of the training images being labeled, this means target-detection neural network 108 may be trained with the portion of the training images labeled.

For example, each image in training images 204 or only those images that do not already have labels, may be processed into image vectors (e.g., following the processes described in connection to blocks 208-244 of FIG. 2). SOM classifier 120 may process each image vector and generate a label indicative of an object-of-interest class depicted by the image vector. For example, for each input image vector, SOM classifier 120 may determine a closest image vector within SOM trained map 252 that corresponds to the input image vector. SOM classifier 120 may then label the input image vector with the label of the closest image vector. The labels generated by SOM classifier 120 may be correlated with the training images from which the image vectors were generated to label the training images.

Untrained neural network 304 may receive the labels from SOM classifier 120 and corresponding training images from training images 204. Untrained neural network 304 may be a neural network configured to detect objects-of-interest within an image. Examples of such neural networks include, but are not limited to a convolutional neural network (CNN), regions-based CNN (R-CNN), fast/faster R-CNN (FR-CNN), you only look once (YOLO), and the like). Untrained neural network 304 may use the training images and corresponding labels to perform supervised learning. Once each training image and corresponding label is processed by the neural network, untrained neural network 304 becomes trained neural network 308.

In some instances, trained neural network 308 may be tested to determine a classification accuracy of the neural network. For example, trained neural network 308 may receive a set of images. Each image of the set of images may include a label, but the label is not passed to trained neural network 308. Trained neural network 308 may generate an indication of an object-of-interest class depicted by each image, which may be compared to the label for that image to determine the accuracy of trained neural network 308 in determining object-of-interest classes. An accuracy metric may be generated from the set of training images. Examples of accuracy metrics can include, but are not limited to, one or more of, a mean squared error (MSE), mean quadratic error, cross-validation, and the like.

Figure 4:
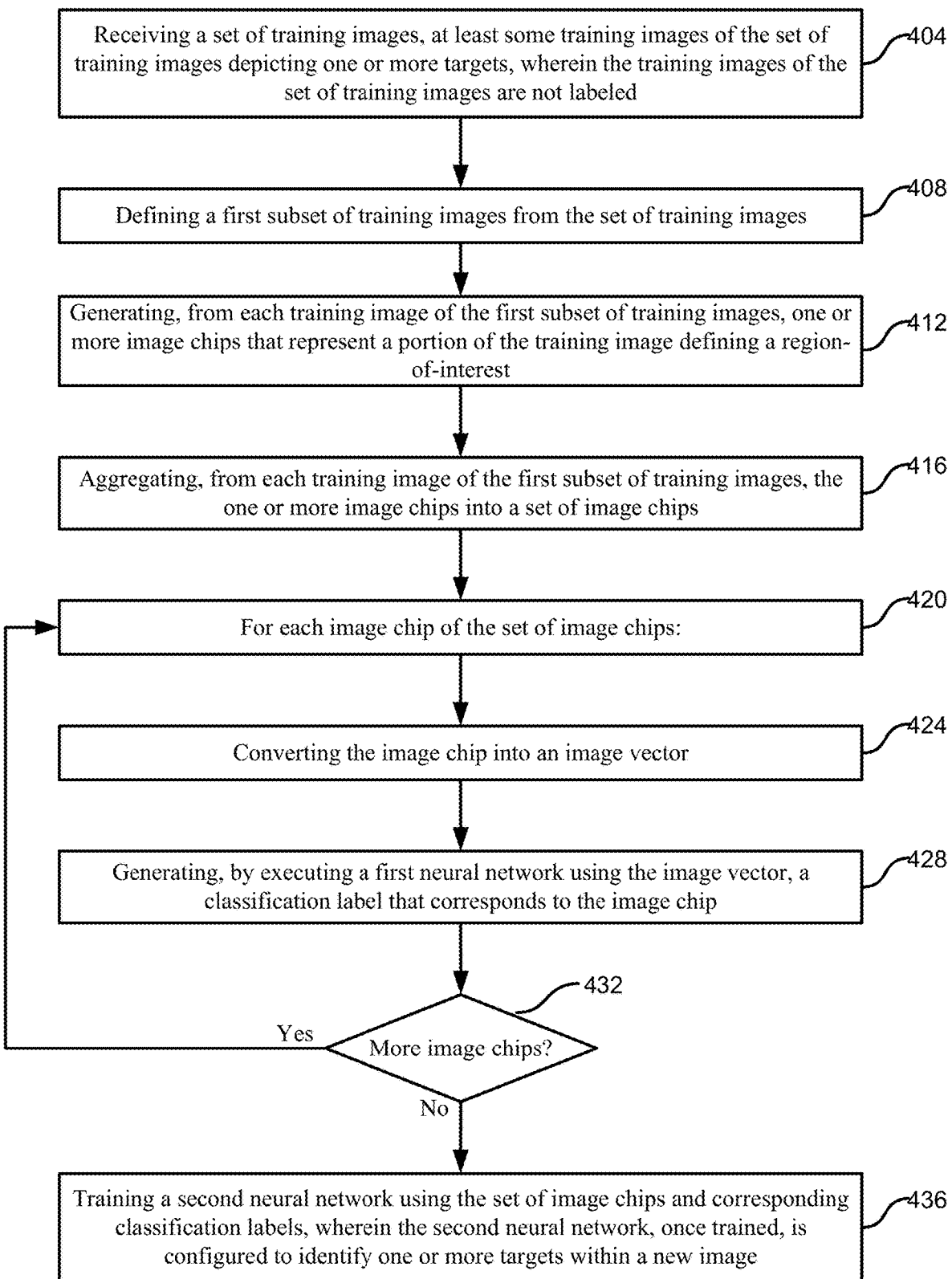
FIG. 4 depicts an example flowchart illustrating a process for training a target-detection neural network according to certain embodiments of the present disclosure.

FIG. 4 depicts an example flowchart illustrating a process for training a target-detection neural network (e.g., such as target-detection neural network 108 of FIG. 1) according to certain embodiments of the present disclosure. The process may begin at block 404 by receiving a set of training images. The training images may include depictions of objects-of-interest for which one or more neural networks may be trained to identify from images. For instance, objects-of-interest may include one or more targets. The training images may also include non-targets such that the one or more neural networks may be able to distinguish a target from clutter (e.g., non-targets).

The training images may include images captured with an image sensor such as image sensor 104. The image sensor may capture images in the infrared spectrum (e.g., midwave infrared with wavelengths of 3-8 μm, longwave infrared with wavelengths of 8-15 μm, or the like), the visible spectrum (e.g., with wavelengths of 400-700 nm), ultraviolet waves, or the like. The image data may be represented as an image (e.g., the image data may be rendered on a display device) or as a data structure. In some instances, the training images may also include artificial images (e.g., manually generated, procedurally generated, or generated by a machine-learning such as a general adversarial network, or the like).

At block 408, the process continues by defining a first subset of training images from the set of training images. The first subset of training images may include all of the training images or a portion thereof. The first subset of training images may not be labeled (e.g., the images do not include an indication of an object-of-interest depicted by the image). The first subset of training images may include a predetermined quantity of training images. In some instances, the first subset of training images may include a predetermined quantity of images for an object-of-interest class to be detected by the trained object-detection neural network. For instance, if the object-detection neural network is to be configured to detect five types of objects-of-interest (e.g., a BTR-70, a BMP-2, a pickup truck, ZSU-23, and a D-20), the first subset of training images may include a predetermined quantity of training images for each of the BTR-70, the BMP-2, the pickup truck, the ZSU-23, and the D-20. The training images may include a representation of an object-of-interest in various contexts (e.g., various distances from the camera, during the day, at night, in different weather conditions, different visibilities, etc.). Though five object-of-interest classes are described in connection with five example targets, the object-detection neural network may be trained to detect any number of object-of-interest classes.

At block 412, the process continues by generating, from each training image of the first subset of training images, one or more image chips that represent a portion of the training image. The portion of the training image may include a region-of-interest (ROI) in which an object-of-interest may be likely to be located within the training image. In some instances, an ROI may be a region of an image that likely includes an object-of-interest. An image chip may correspond to an N×I pixel portion of the training image. For example, an image chip may correspond to a 20×40 pixel portion of the training image. In other examples, an image chip may correspond to 20×20 pixels, 40×20 pixels, 40×40, 80×40 pixels, or the like. Each image chip may include clutter, a portion of an object-of-interest, and/or an entire object-of-interest. In other instances, an ROI may correspond to a random contiguous set of pixels (e.g., to N×I) within an image.

At block 416, the process continues by aggregating, from each training image of the first subset of training images, the one or more image chips into a set of image chips. Aggregating the image chips into the set of image chips enables a first neural network (described more fully below) to process the image chips.

At block 420, the process continues by performing block 424 and block 428 for each image chip of the set of image chips. As illustrated, at block 424 the process continues by converting, for each image chip, the image chip into an image vector. An image vector may include an ordered set of features extracted from an image chip. This enables an entire image to be represented by a discrete dataset of ordered features. The image vector may include features extracted from an image chip through one or more image processing techniques (e.g., filtering, affine transformations, etc.). Alternatively or additionally, each pixel of the image chip may correspond to one or more features (e.g., grayscale value or red/green/blue values, etc.). The image vector may represent each pixel feature in the order in which the pixel is located in the image chip (e.g., the set of pixel features for pixel 1, the top corner pixel, followed by the set of pixel features for pixel 2, an adjacent pixel to pixel 1, etc.).

At block 428, the process includes generating, by executing a first neural network using the image vector, a classification label that corresponds to the image chip. The classification label may correspond to an object-of-interest class depicted in the image chip. The first neural network may be a self-organizing map (SOM) classifier (e.g., such as SOM classifier 120). The first neural network may include an X by Y map of image vectors organized through an unsupervised learning phase in which image vectors from training images (e.g., the same training images of block 404 or different training images) are unlabeled and a supervised learning phase in which the first neural network learns the classification labels for the image vectors in the map. During the supervised learning phase, only a percentage of the training images may be labeled. During execution of the first neural network, image vectors may be input to the first neural network. The first neural network may then determine, for each input image vector, the closest image vector in the map, and assign the classification label of that image vector to the input image vector. This enables each training image to be labeled with a classification label with only a percentage of the training images including a label beforehand.

At block 432, the process continues by determining if there are additional image chips to process with the first neural network. If there are more image chips to process, the process returns to block 420 where a next image chip is processed (e.g., converted to an image vector at block 424 and classified with a label generated by executing the first neural network using the image vector at block 428). This process may continue until there are no more image chips to process at which point, the process continues to block 426. Alternatively, rather than waiting for each image vector to receive a classification label, the process may pass the image chips with the corresponding classification labels to block 436 to begin training a second neural network (later described) as the classification labels are output from the first neural network. The process may continue to process image chips (e.g., at blocks 424-428) in parallel with training the second neural network until all of the image chips have been processed.

At block 436, the process continues by training a second neural network using the set of image chips and corresponding classification labels. The second neural network may be a neural network configured to detect objects-of-interest within images such as neural network 112. The second neural network may be trained using a supervised learning process in which the second neural network processes each image chip with the corresponding classification label to learn how to detect objects-of-interest within images. Once trained, the second neural network may be configured to classify/identify one or more targets within a new (unlabeled) image.

It should be appreciated that the specific steps illustrated in FIG. 4 provide a particular process for training a target-detection neural network according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
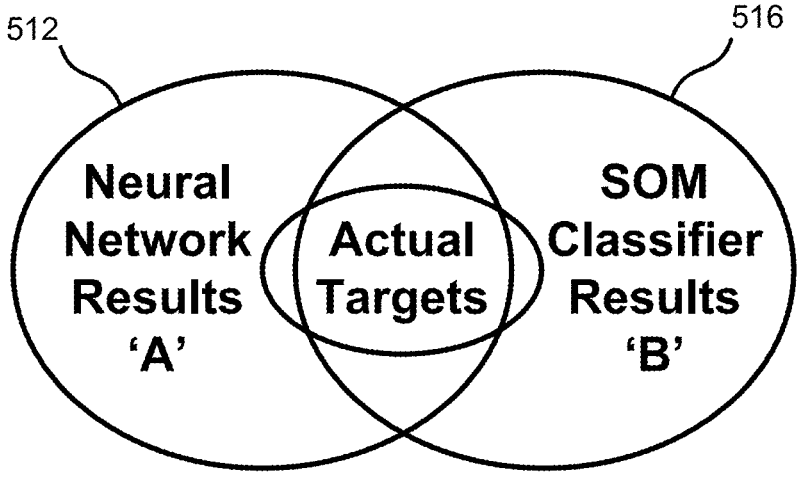
FIG. 5A illustrates a Venn diagram showing target detection results for a neural network and a SOM classifier according to certain embodiments of the present disclosure.

FIG. 5A illustrates a Venn diagram showing target detection results for a neural network and a SOM classifier according to certain embodiments of the present disclosure. As illustrated in FIG. 5A, a neural network, such as neural network 112, may detect a first set of targets 'A' 512. The first set of targets 'A' 512 may include some actual targets as well as some false alarms found by the neural network. Similarly, a SOM classifier, such as SOM classifier 120, may detect a second set of targets 'B' 516. The second set of targets 'B' 516 may also include some actual targets as well as some false alarms found by the SOM classifier. Thus, the combined set of targets may include at least one overlapping potential target.

Assuming that the actual targets found by both the neural network and the SOM classifier typically reside in A∩B, then a false alarm found by both the neural network and the SOM classifier will also reside in A∩B. Since A∩B is smaller than either A or B, the set of false alarms is reduced. On the other hand, the set of targets discovered by both systems will largely remain unchanged.

Figure 5B:
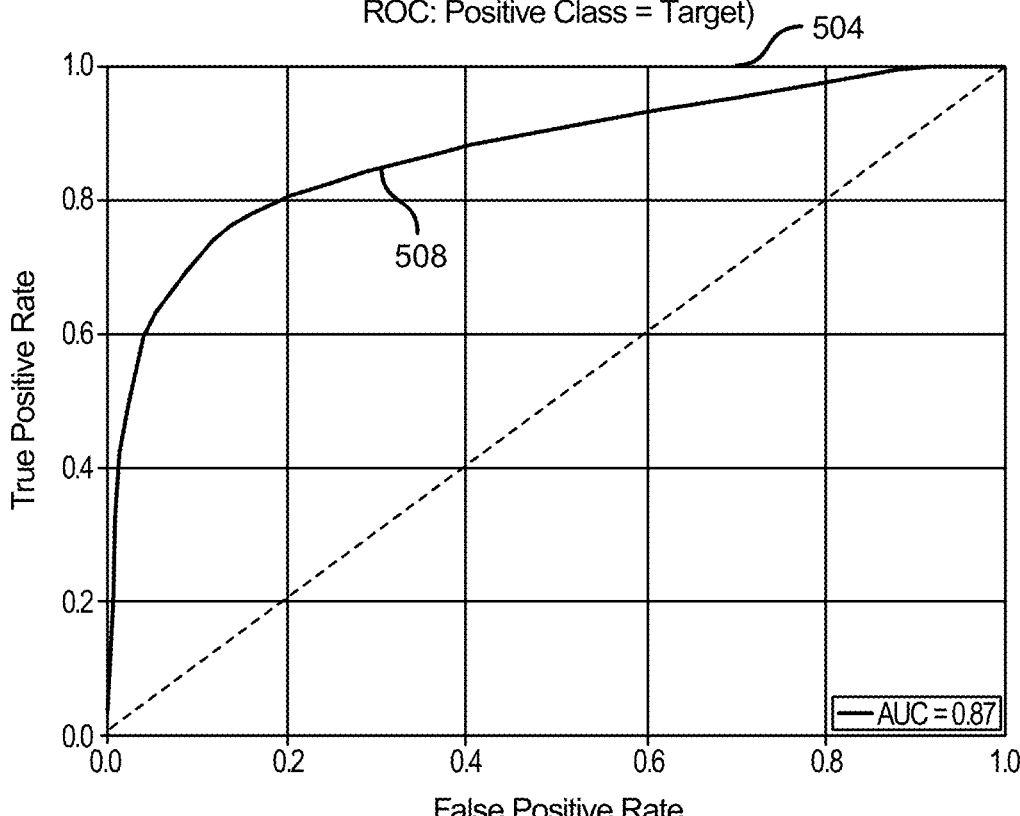
FIG. 5B illustrates an example graph depicting performance of a trained target-detection neural network according to certain embodiments of the present disclosure.

FIG. 5B illustrates an example recover operating characteristic (ROC) graph 504 depicting performance of a trained target-detection neural network according to certain embodiments of the present disclosure. ROC graph 504 represents the accuracy of a target-detection neural network, such as target-detection neural network 108, to identify targets (e.g., any object-of-interest) from clutter (e.g., any non-object-of-interest). The abscissa of ROC graph 504 represents the false positive rate of the trained target-detection neural network. A false positive may include clutter that both a neural network, such as neural network 112, falsely identified as a target and a SOM classifier, such as SOM classifier 120, falsely classified as a target. The ordinate of ROC graph 504 represents the true positive rate. The true positive rate may include an instance in which both the neural network falsely identified a target and the SOM classifier correctly identified a target.

The area under curve (AUC) 508 is 0.87 indicating that the target-detection neural network has a classification accuracy of 87%. The accuracy of the target-detection neural network may be based in part on the percentage of (true) labels used during the supervised learning of the SOM classifier. Increasing the quantity of (true) labeled images may increase the accuracy of the target-detection neural network. Beyond a threshold percentage, any increase in accuracy of the target-detection neural network may become marginal.

Thus, as shown in FIG. 5B, ROC graph 504 demonstrates that the target-detection neural network finds 80% of the targets detected by a neural network, while also "rejecting" 80% of the clutter, thereby providing a system that reduces the magnitude of false alarms with little loss of targets.

FIG. 6 depicts an example flowchart illustrating a process for executing a target-detection neural network to identify targets within images according to certain embodiments of the present disclosure. At block 604, the process begins by receiving an image from an image sensor. The image sensor may be image sensor 104 as previously described. The image sensor may capture images in the infrared spectrum (e.g., midwave infrared with wavelengths of 3-8 μm, long-wave infrared with wavelengths of 8-15 μm, or the like), the visible spectrum (e.g., with wavelengths of 400-700 nm), ultraviolet waves, or the like. The image data may be represented as an image (e.g., the image data may be rendered on a display device) or as a data structure. In some instances, the training images may also include artificial images (e.g., manually generated, procedurally generated, or generated by machine-learning such as a general adversarial network, or the like.

At block 608, the process continues by identifying a plurality of locations-of-interest within the image by a first neural network. The first neural network may be neural network 112, which is configured to identify an object-of-interest in an image (e.g., a potential target or one or more potential targets).

At block 612, the process continues by generating a first classification label for each location-of-interest of the plurality of locations-of-interest by the first neural network. executing a first neural network using the image. The first neural network 112 may determine one or more ROIs within the image that are likely areas in which a target is to be located. The ROIs may correspond to each location of interest and/or a portion of the image data within which an object-of-interest may be located. The ROIs may enable the first neural network to reduce processing resources by only processing portions of the image (e.g., ROIs) rather than the whole image.

The first neural network may continue processing the ROIs, after an identification of the ROIs and/or the associated locations of interest are output, to generate a first classification label for each ROI. The first classification label may be an indication that an ROI includes a target or clutter (e.g., a non-object-of-interest such as the horizon or the sky). In some instances, the first classification may also indicate an identification of the target (e.g., that the target is a BTR-70, D-20, etc.) depicted with the image.

In some instances, the first neural network may generate a plurality of first classification labels for each region-of-interest and a confidence value for each first classification label indicating a probability that that classification label is correct. Each first classification label of the plurality of classification labels may be different. For example, in a binary classification, the plurality of first classification labels may include a first label of target with a corresponding confidence value and a second first classification label of clutter with a corresponding confidence value. In a non-binary classification, the plurality of first classification labels may include an identification of the target within the image and a corresponding confidence value that the identified target is correct.

At block 616, the process may continue by extracting, from the image, a plurality of image chips derived from the plurality of locations-of-interest. In some embodiments, the first neural network may output the plurality of image chips (e.g., with each image chip being at least a portion of an ROI). Additionally, or alternatively, image chips may be produced by another component of a target-detection neural network, such as ROI chip extraction 116 described above, from the locations of interest defined by the first neural network. For each image chip, a two-dimensional map representative of the image chip may be generated. Alternatively, one or more image chips may be generated from each ROI as described in relation to ROI chips 208 of FIG. 2).

At block 620, the process continues by generating a second classification label for each image chip of the plurality of image chips by a second neural network. The second neural network may be a classifier such as SOM classifier 120. The plurality of image chips may be generated according to the processes described in relation to ROI chips 208 of FIG. 2. For example, an ROI chip extraction process, such as ROI chip extraction 116 described above, may receive the image in parallel or in series with the first neural network. The ROI chip extraction process may then receive the plurality of locations of interest produced by the first neural network and extract image chips corresponding to ROIs associated with the locations of interest and provide them to the second neural network. Additionally, or alternatively, the second neural network may perform some or all of the image processing to generate the image chips from the image using the plurality of locations of interest identified by the first neural network. The second neural network may process each image chip (e.g., as described in relation to ROI chips 208 of FIG. 2) to generate a second classification label for each image chip.

In some instances, the second neural network may generate a plurality of second classification labels for each image chip and a score for each second classification label indicating a probability that that classification label is correct. Each second classification label of the plurality of classification labels may be different.

At block 624, the process continues by determining an identification of a set of targets within the image from the plurality of locations of interest, the corresponding first classification labels, the plurality of image chips, and the corresponding second classification labels. For each location of interest and corresponding image chip (derived from a location of interest), the target-detection neural network may determine if the first classification label and the second classification label match (e.g., correspond to a same classification label). If the first classification label and the second classification label match, then the classification label is added to the set of targets and the process moves on to the next location of interest and corresponding image chip. If the first classification label and the second classification label do not match, the target-detection neural network can determine which classification label is associated with a higher confidence value/score. The target-detection neural network may then add the classification label (of the first classification label and the second classification label) that has the highest confidence value/score. In some instances, the target-detection neural network may first determine if the classification label (of the first classification label and the second classification label) that has the highest confidence value has a confidence value that is greater than a threshold. If not, the target-detection neural network may not add any classification label to the set of targets for this location of interest and corresponding image chip. If the confidence value is greater than the threshold, then the target-detection neural network may add the classification label (of the first classification label and the second classification label) that has the highest confidence value.

In some instances, a location of interest may have a plurality of corresponding image chips, also referred to as a corresponding ROI (each of the image chips being derived from the location of interest). In those instances, the target-detection neural network may select the classification label that has the highest confidence/score to be added to the set of targets. The target-detection neural network may first determine whether the classification label that has the highest confidence/score is greater than the threshold before adding the classification label to the set of targets. If the classification label that has the highest confidence/score is less than the threshold, then nothing gets added to the set of targets.

In some instances, the target-detection neural network may order each first classification label and each second classification label according to confidence values/scores and select the top predetermined quantity of classification labels (e.g., the top three classification labels having the highest confidence values/scores) to be included in the set of targets. Alternatively, the target-detection neural network, may select those classification labels that have a confidence value/score that is greater than a threshold (e.g., the same threshold described above or a different threshold) to be included in the set of targets.

The set of targets may include an indication of a target or a classification of the target located at each location of interest, within each ROI, within image chip, or some combination of all three. In some instances, the set of targets may also include, for each target, an identification of a location of the target within the image. The location may be correlated with other location information (e.g., location of the camera, geolocation information, maps, etc.) so as to provide a precise location of the target within the real world.

At block 628, the process continues by transmitting the identification of the set of targets within the image. The set of targets may be transmitted to a display device (e.g., locally connected to a target-detection neural network or remote), to a computing device, server, weapons platform, automated targeting platform, database, or the like. For instance, the set of targets may be archived for intelligence purposes (e.g., marking troop movements, locations of targets, etc. within a field of operations). In another example, the set of targets may be processed by a weapons platform or automated targeting platform that may then provide a firing solution for one or more targets of the set of targets. In that example, the set of targets output from the target-detection neural network may be automatically targeted and/or eliminated.

It should be appreciated that the specific steps illustrated in FIG. 6 provide a particular process for executing a target-detection neural network to identify targets within images according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 7 depicts an example block diagram of an electronic device training and/or executing a target-detection neural network according to certain embodiments of the present disclosure. Any suitable computing system or group of computing systems can be used for performing the operations described herein. For example, FIG. 7 depicts examples of computing system 700 that trains and/or executes a target-detection neural network. In some instances, computing system 700 may train target-detection neural network (e.g., train SOM classifier 120 using unsupervised then supervised learning and train neural network 112) that may then be executed to detect targets within images received from an image sensor such as image sensor 104 as depicted in FIG. 1. In other instances, target-detection neural network 108 may be trained by another computing system and provided to computing system 700 in an already trained state.

Computing system 700 may include one or more processors 704 communicatively coupled to one or more memory devices 708. One or more processors 704 may execute computer-executable program code stored in a memory device 708, accesses information stored in the memory device 708, or the like. Examples of processors 704 include, but are not limited to, microprocessors, application-specific integrated circuits (ASIC), field-programmable gate arrays (FPGA), mask programmable gate arrays (MPGA), or any other suitable processing device. One or more processors 704 can include any number of processing devices, including a single processing device.

Memory device 708 may include any suitable non-transitory computer-readable medium for storing data, program code, or the like. A computer-readable medium can include any electronic, optical, magnetic, or other storage device capable of providing a processor with computer-readable instructions or other program code. Examples of computer-readable media include, but are not limited to magnetic disks, memory chips, ROM, RAM, flash memories, ASICs, optical storage, magnetic tapes, other magnetic storages, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

Computing system 700 may also include a number of external or internal devices, such as input or output devices. For example, computing system 700 may include input/output (I/O) interface 716. Interface 716 may receive input and/or transmit output to devices connected to computing system 700 such as display device 720.

Computing system 700 may execute program code that configures one or more processors 704 to perform one or more of the operations described herein. The program code includes, for example, program code to: train target-detection neural network 108 (e.g., train SOM classifier 120 using unsupervised and supervised learning from training images derived from training data 712 or image sensor 104, train neural network 112, ROI chip extraction 116, etc.), execute target-detection neural network 108 from images obtained from image sensor 104, or perform other operations as described herein. The program code may be stored in memory device 708 or any suitable computer-readable medium and may be executed by one or more processors 704 or any other suitable processor. In some instances, the program code can execute in a cloud environment where portions of the program code are executed by multiple devices in parallel.

Computing system 700 can access training data for training target-detection neural network such as training images, classification labels, and/or the like. Training data may be stored locally in training data 712 or received from a remote source such as a remote computing system, server, database, or the like.

Computing system 700 may also include a network interface device 724. Network interface device 724 may include any device or group of devices configured to establish a wired or wireless connection to one or more networks. Examples of network interface device 724 include, but are not limited to, Ethernet network adapters, modems, and the like. Computing system 700 may be configured to communicate with one or more other computing devices (e.g., automated targeting platforms, weapon platforms, other computing systems, image sensors, servers, databases, etc.) via a network using network interface device 724.

Numerous specific details are set forth herein to provide a thorough understanding of the claimed subject matter. However, the claimed subject matter may be practiced without these specific details. In other instances, methods, apparatuses, or systems that would be known by one of ordinary skill have not been described in detail so as not to obscure claimed subject matter.

Unless specifically stated otherwise, terms such as "processing," "computing," "calculating," "determining," and "identifying" or the like may refer to actions or processes of a computing system, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Examples of the methods disclosed herein (e.g., FIG. 4 and FIG. 6) may be performed through operation of such computing systems. The order of the blocks presented in the examples above can be varied, for example, blocks can be re-ordered, combined, repeated, omitted, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:

receiving, from an image sensor, an image;

identifying, by a first neural network, a plurality of locations-of-interest within the image;

generating, by the first neural network, a first classification label for each location-of-interest of the plurality of locations-of-interest, wherein the first classification label is one of a plurality of classification labels that each correspond to an object class of a plurality of object classes;

outputting the plurality of locations-of-interest to a region of interest chip extraction processor;

extracting, from the image, based on the plurality of locations-of-interest generated by the first neural network and using the region of interest chip extraction processor, a plurality of image chips;

generating, by a second neural network and in parallel with generating the first classification label for each location-of-interest, a second classification label of the plurality of classification labels for each image chip of the plurality of image chips, wherein the second neural network is configured to generate a label for each of a set of training images, and wherein the first neural network is trained using the set of training images and corresponding label;

determining an identification of a set of targets within the image using the plurality of locations-of-interest, the first classification label for each location-of-interest of the plurality of locations-of-interest, the plurality of image chips, and the second classification label for each image chip of the plurality of image chips, wherein determining the identification of the set of targets within the image includes determining, for a first subset of the first classification labels, that a confidence value associated with each of the first subset of the first classification labels is greater than a first threshold; and transmitting the identification of the set of targets within the image.

2. The method of claim 1, wherein the first neural network is a regions-based convolutional neural network (R-CNN).

3. The method of claim 1, wherein the second neural network is a self-organizing map.

4. The method of claim 1, wherein the second neural network is trained using a first partially-unsupervised training phase and a second supervised training phase.

5. The method of claim 1, further comprising generating, for each image chip of the plurality of image chips, an image vector.

6. The method of claim 1, further comprising generating, for each image chip of the plurality of image chips, a two-dimensional map representative of the image chip, before executing the second neural network.

7. The method of claim 1, wherein determining the identification of the set of targets within the image includes:

determining, for a second subset of the second classification labels, that a score associated with each of the second subset of the second classification labels, is greater than a second threshold; and defining the set of targets to include:

targets represented at locations-of-interest corresponding to the first subset of the first classification labels; and targets represented in image chips corresponding to the second subset of the second classification labels.

8. The method of claim 1, wherein the set of targets includes at least one overlapping potential target.

9. The method of claim 1, wherein:

the first neural network is a regions-based convolutional neural network (R-CNN); and the second neural network is a self-organizing map classifier.

10. A method comprising:

receiving a set of training images;

defining a first subset of training images of the set of training images, wherein training images in the first subset of training images are not labeled;

identifying, by a first neural network, a location-of-interest in each training image;

generating, by the first neural network, a first classification label for each location-of-interest;

outputting the location-of-interest in each training image to a region-of-interest chip extraction processor;

generating, using the region-of-interest chip extraction processor, from each training image in the first subset of training images and the location-of-interest, an image chip representing a portion of each training image and defining a region-of-interest;

aggregating, from each training image in the first subset of training images, the image chips into a set of image chips;

for each image chip of the set of image chips:

converting the image chip into an image vector;

generating, in parallel with generating the first classification label, and by executing a second neural network using the image vector, a second classification label that corresponds to the image chip, wherein the second neural network is trained by:

defining a second subset of the set of training images, each image in the second subset of the set of training images being unlabeled;

executing an unsupervised learning phase using the set of training images, wherein the second neural network defines a temporary classification label for each training image in the second subset of the set of training images;

defining a third subset of the set of training images, wherein each training image in the third subset of the set of training images is associated with a new classification label that was not defined by the second neural network; and executing a supervised learning phase using the third subset of the set of training images and the new classification labels;

executing the second neural network using the second subset of the set of training images, wherein the second neural network generates an updated classification label for each training image in the second subset of the set of training images; and replacing, for each training image in the second subset of the set of training images, the temporary classification label with the updated classification label; and determining an identification of a set of targets within the image chip using the location-of-interest, the first classification label, the image chip, and the second classification label; and training a third neural network using the set of image chips, the first classification labels generated by the first neural network, and the second classification labels generated by the second neural network, wherein the third neural network, once trained, is configured to identify one or more targets within a new image.

11. The method of claim 10, wherein the second neural network is a self-organizing map.

12. The method of claim 10, wherein the third neural network is a regions-based convolutional neural network (R-CNN).

13. The method of claim 10, wherein generating the second classification label that corresponds to the image chip includes:

determining a neuron of the second neural network that is closest to the image vector;

identifying a label that corresponds to the neuron; and generating the second classification label for the image vector, wherein the second classification label corresponds to the label that corresponds to the neuron.

14. The method of claim 10, wherein the second neural network is trained using semi-supervised learning.

15. The method of claim 10, further comprising manually labeling each training image in the third subset of the set of training images.

16. The method of claim 10, further comprising:

executing the third neural network using a particular image, wherein the third neural network generates an identification of one or more locations-of-interest and an identification of one or more potential targets within the particular image;

defining a new set of image chips from the one or more locations-of-interest;

executing the second neural network using the new set of image chips, wherein the second neural network generates, for each image chip of the new set of image chips, a particular classification label for the image chip; and outputting, based on the identification of one or more potential targets and the particular classification label for each image chip of the one or more image chips, an identification of a set of targets within the particular image.

17. The method of claim 10, wherein the region-of-interest is associated with a probability that the region-of-interest includes a representation of a target.

\* \* \* \* \*